United States Patent
Moriguchi (10) Patent No.: US 10,593,223 B2
(45) Date of Patent: Mar. 17, 2020

(54) ACTION EVALUATION APPARATUS, ACTION EVALUATION METHOD, AND COMPUTER-READABLE STORAGE MEDIUM

(71) Applicant: NEC Solution Innovators, Ltd., Koto-ku, Tokyo (JP)

(72) Inventor: Masakazu Moriguchi, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 0 days.

(21) Appl. No.: 15/553,838

(22) PCT Filed: Feb. 24, 2016

(86) PCT No.: PCT/JP2016/055499
§ 371 (c)(1),
(2) Date: Aug. 25, 2017

(87) PCT Pub. No.: WO2016/140129
PCT Pub. Date: Sep. 9, 2016

(65) Prior Publication Data
US 2018/0053438 A1    Feb. 22, 2018

(30) Foreign Application Priority Data

Mar. 5, 2015  (JP) .................. 2015-043583

(51) Int. Cl.
*G09B 9/00*    (2006.01)
*G09B 19/00*   (2006.01)
(Continued)

(52) U.S. Cl.
CPC ............... *G09B 9/00* (2013.01); *G01P 13/00* (2013.01); *G06T 11/60* (2013.01); *G09B 19/00* (2013.01); *G09B 19/24* (2013.01); *G09B 23/28* (2013.01)

(58) Field of Classification Search
CPC combination set(s) only.
See application file for complete search history.

(56) References Cited

U.S. PATENT DOCUMENTS 6,059,576 A * 5/2000 Brann ................... A61B 5/1116
340/686.1
8,914,472 B1 * 12/2014 Lee .................... H04L 29/06476
709/205

(Continued)

FOREIGN PATENT DOCUMENTS

CN    102201099 A    9/2011
CN    102598012 A    7/2012
(Continued)

OTHER PUBLICATIONS

Fujitsu Corporation, "Virtual Process Plan/Production Simulator", online, Feb. 18, 2015, searched for on Mar. 1, 2015, two pages.

(Continued)

*Primary Examiner* — Motilewa Good Johnson (57) ABSTRACT

An action evaluation apparatus 10 includes: an action detection unit 11 that detects an action of a target person; an action evaluation unit 12 that determines whether or not the detected action matches a specific action set in advance; and a visual representation addition unit 13 configured to, if it is determined by the action evaluation unit 12 that the detected action matches the specific action, specify a part of the person associated with the specific action in advance and add a visual representation to the part associated with the specific action on the person or an object representing the person displayed on a screen.

6 Claims, 5 Drawing Sheets

(51) Int. Cl.
*G09B 19/24* (2006.01)
*G09B 23/28* (2006.01)
*G01P 13/00* (2006.01)
*G06T 11/60* (2006.01)

(56) References Cited

U.S. PATENT DOCUMENTS

| | | | | |
|---|---|---|---|---|
| 9,198,622 | B2* | 12/2015 | Kaleal, III | A61B 5/0205 |
| 9,501,942 | B2* | 11/2016 | Kaleal, III | G09B 5/02 |
| 2011/0162066 | A1 | 6/2011 | Kim et al. | |
| 2011/0246329 | A1 | 10/2011 | Geisner et al. | |
| 2011/0302509 | A1* | 12/2011 | Leacock | G06Q 10/10 |
| | | | | 715/756 |
| 2013/0024785 | A1* | 1/2013 | Van Wie | G06F 3/04815 |
| | | | | 715/753 |
| 2013/0042296 | A1* | 2/2013 | Hastings | G06F 21/10 |
| | | | | 726/1 |
| 2014/0267010 | A1* | 9/2014 | Pasquero | G06T 19/006 |
| | | | | 345/156 |
| 2014/0310595 | A1* | 10/2014 | Acharya | G06F 9/453 |
| | | | | 715/706 |
| 2015/0037771 | A1* | 2/2015 | Kaleal, III | G09B 5/02 |
| | | | | 434/257 |
| 2015/0038806 | A1* | 2/2015 | Kaleal, III | A61B 5/4872 |
| | | | | 600/301 |
| 2015/0196804 | A1* | 7/2015 | Koduri | G06K 9/00342 |
| | | | | 482/8 |
| 2016/0086500 | A1* | 3/2016 | Kaleal, III | G06T 19/00 |
| | | | | 434/257 |

FOREIGN PATENT DOCUMENTS

| | | |
|---|---|---|
| JP | 2003-330971 A | 11/2003 |
| JP | 2005-134536 A | 5/2005 |
| JP | 2006-171184 A | 6/2006 |
| JP | 2006-302122 A | 11/2006 |
| JP | 2013-088730 A | 5/2013 |

OTHER PUBLICATIONS

Norihiro Takahashi et al., "Posture Estimation from Bird's-eye View of Range Image Sensor", FIT2007 Dai 6 Kai Forum on Information Technology Ippan Koen Ronbunshu separate vol. 3, Information Processing Society of Japan, Aug. 22, 2007, pp. 79 to 80.

Kazuhiro Miyasa et al., "A Recording and Visualization Method of Working Activities in a Mixed Reality Space", Transactions of Information Processing Society of Japan ,vol. 47, No. 1, Information Processing Society of Japan, Jan. 15, 2006, pp. 181 to 192 (particularly, pp. 183 to 184 '3.Teian Shuho', pp. 185 to 186 '4.MR Work Visualizer no Jisso').

International Search Report for PCT Application No. PCT/JP2016/055499, dated May 17, 2016.

Chinese Office Action for CN Application No. 201680013144.8 dated Feb. 2, 2019 with English Translation.

* cited by examiner

Fig.5

ACTION EVALUATION APPARATUS, ACTION EVALUATION METHOD, AND COMPUTER-READABLE STORAGE MEDIUM This application is a National Stage Entry of PCT/JP2016/055499 filed on Feb. 24, 2016, which claims priority from Japanese Patent Application 2015-043583 filed on Mar. 5, 2015, the contents of all of which are incorporated herein by reference, in their entirety.

TECHNICAL FIELD

The present invention relates to an action evaluation apparatus and an action evaluation method for evaluating an action performed when performing a task or the like, and to a computer-readable storage medium storing a program for realizing the action evaluation apparatus and action evaluation method.

BACKGROUND ART

In general, in a production line at a factory, it is an object to achieve an increase in the efficiency of a task by eliminating problems such as the operation of a machine being difficult to understand, the meaning of notices being difficult to understand, having too much unnecessary information, lacking necessary information, and forcing unnecessary tasks on workers. This is because realizing an increase in task efficiency reduces the physical burden on workers, which results in suppressing the occurrence of faulty products.

Also, achievement of the above-described object is thought to be possible also through countermeasures taken by the workers themselves, such as voluntarily asking veteran workers about the operation method and thoroughly reading manuals. However, if only these countermeasures are taken, the achievement of the object will be insufficient. This is because it is often the case that problems that the workers themselves do not notice, such as near-misses, mistakes caused by misunderstanding, and problems first discovered upon use, are more likely and cause significant hindrances to the achievement of the object more often than problems that the workers themselves notice.

For this reason, in order to achieve the above-described object, it is important to eliminate problems that the workers themselves do not notice. Also, a task simulator executed on a computer is given as one method for eliminating such problems (e.g., see Non-Patent Document 1).

Specifically, Non-Patent Document 1 discloses a task simulator. The task simulator disclosed in Non-Patent Document 1 generates a production line in a virtual space using three-dimensional data of a product, two-dimensional layout data of the factory, and information on the assembly sequence and the like. Also, the task simulator disclosed in Non-Patent Document 1 calculates various types of indices and displays them on a screen.

Examples of indices include an index indicating whether or not the worker can reach a part with his or her hand, an index indicating whether or not the worker can perform an assembly task in the reaching range of his or her hand, and an index indicating whether or not the necessary equipment and part shelves have been arranged.

Accordingly, with the task simulator disclosed in Non-Patent Document 1, a manager can keep track of the actions of workers by checking the various indices, and therefore it is thought that the problems not noticed by the workers themselves can be eliminated.

CITATION LIST

Non-Patent Document

Non-Patent Document 1: "Virtual Process Plan/Production Simulator", online, Feb. 18, 2015, Fujitsu Corporation, searched for on Mar. 1, 2015, Internet www.fujitsu.com/jp/solutions/industry/manufacturing/monozukuri-total-support/products/plm-software/dmu/gp4/advantages-benefits/index.html

DISCLOSURE OF THE INVENTION

Problems to be Solved by the Invention

However, with the task simulator disclosed in Non-Patent Document 1 described above, since the manager needs to identify the problems based on the various indices, there is a possibility that the manager will fail to identify all of the problems. Also, with the task simulator disclosed in Non-Patent Document 1 described above, the actual movement of the worker is not incorporated into the virtual space, and therefore there is a possibility that the manager will fail to identify all of the problems.

An example of an object of the present invention is to provide an action evaluation apparatus, an action evaluation method, and a computer-readable recording medium, according to which it is possible to eliminate the above-described problems and based on actual actions, suppress failure to identify all problems that are caused by the actions.

Means for Solving the Problems

In order to achieve the above-described object, an action evaluation apparatus according to an aspect of the present invention includes: an action detection unit configured to detect an action of a target person;
an action evaluation unit configured to determine whether or not the detected action matches a pre-set specific action; and
a visual representation addition unit configured to, if it is determined by the action evaluation unit that the detected action matches the specific action, add a visual representation to a portion associated with the specific action in advance, on the person or an object representing the person displayed on a screen.

In order to achieve the above-described object, an action evaluation method according to an aspect of the present invention includes:
(a) a step of detecting an action of a target person;
(b) a step of determining whether or not the action detected in the step (a) matches a pre-set specific action; and
(c) a step of, if it is determined in the step (b) that the detected action matches the specific action, adding a visual representation to a portion associated with the specific action in advance, on the person or an object representing the person displayed on a screen.

Furthermore, in order to achieve the above-described object, a computer-readable storage medium according to an aspect of the present invention stores a program including commands for causing a computer to execute:
(a) a step of detecting an action of a target person;
(b) a step of determining whether or not the action detected in the step (a) matches a pre-set specific action; and (c) a step of, if it is determined in the step (b) that the detected action matches the specific action, adding a visual representation to a portion associated with the specific action in advance, on the person or an object representing the person displayed on a screen.

Effects of the Invention

As described above, according to the present invention, it is possible to suppress failure to identify all problems that are caused by actions, based on actual actions.

DESCRIPTION OF EMBODIMENT

Embodiment

Figure 1:
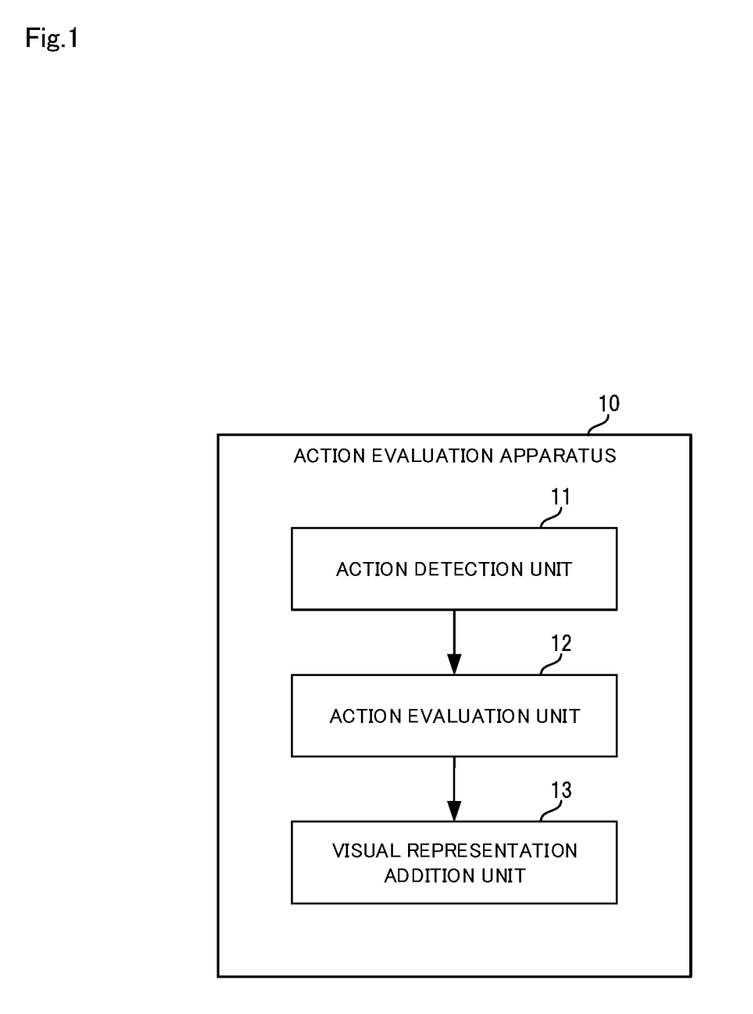
FIG. 1 is a block diagram showing a schematic configuration of an action evaluation apparatus according to an embodiment of the present invention.

Hereinafter, an action evaluation apparatus, an action evaluation method, and a program according to an embodiment of the present invention will be described with reference to FIGS. 1 to 5.
Configuration of Apparatus First, a configuration of the action evaluation apparatus according to the present embodiment will be described with reference to FIG. 1. FIG. 1 is a block diagram showing a schematic configuration of the action evaluation apparatus according to an embodiment of the present invention. As shown in FIG. 1, an action evaluation apparatus 10 includes an action detection unit 11, an action evaluation unit 12, and a visual representation addition unit 13.

Among these, the action detection unit 11 detects an action performed by a target person. The action evaluation unit 12 determines whether or not the action detected by the action detection unit 11 matches a pre-set specific action.

If it is determined by the action evaluation unit 12 that the action matches the specific action, the visual representation addition unit 13 adds a visual representation to a portion (denoted hereinafter as "associated portion") associated with the specific action in advance, on the person or object representing the person displayed on a screen.

Thus, when a specific action that causes a problem is detected based on an actual action of the target person, the action evaluation apparatus 10 displays a visual representation indicating the specific action. For this reason, according to the action evaluation apparatus 10, failure to identify all problems caused by the action is suppressed.

Figure 2:
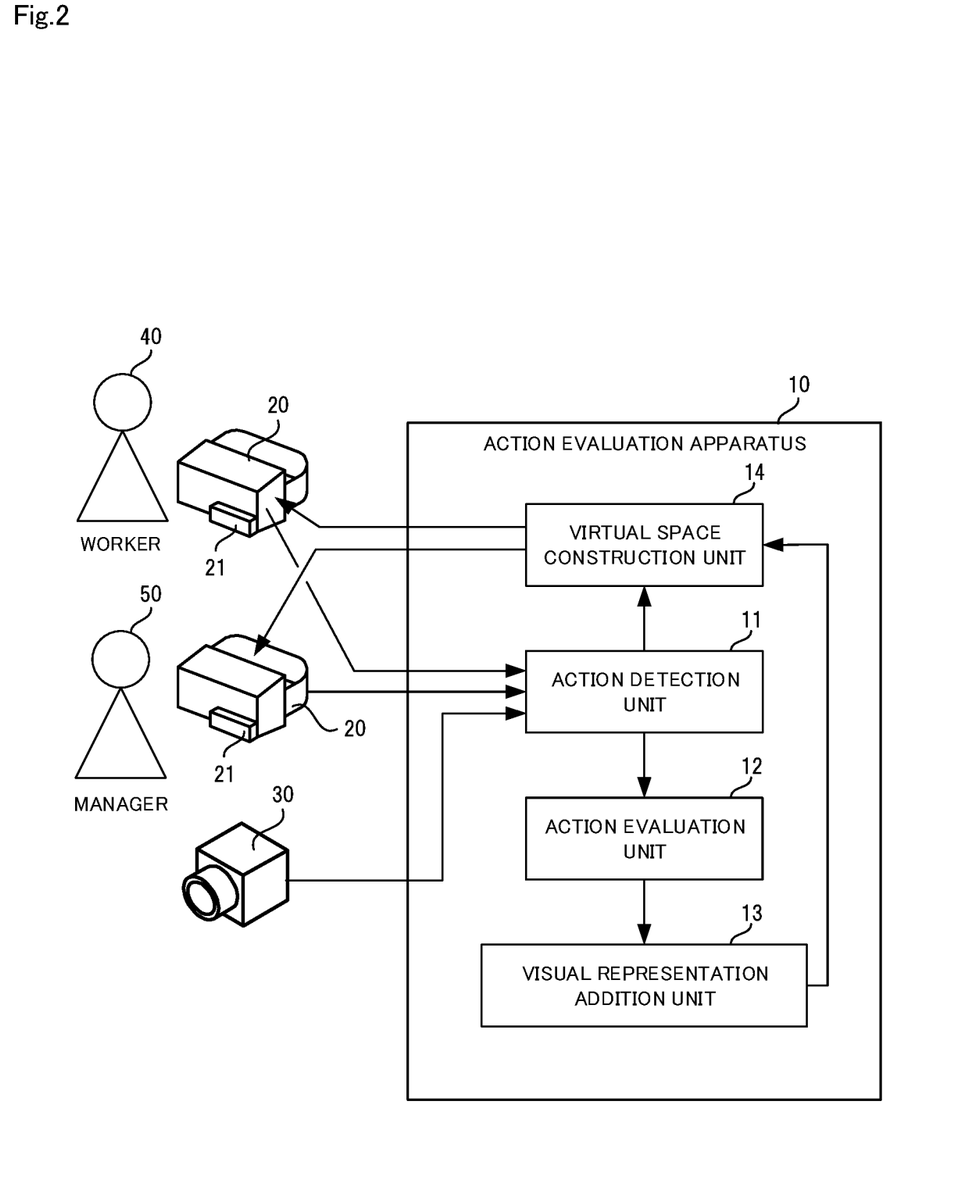
FIG. 2 is a block diagram showing a specific configuration of an action evaluation apparatus according to an embodiment of the present invention.
Figure 3:
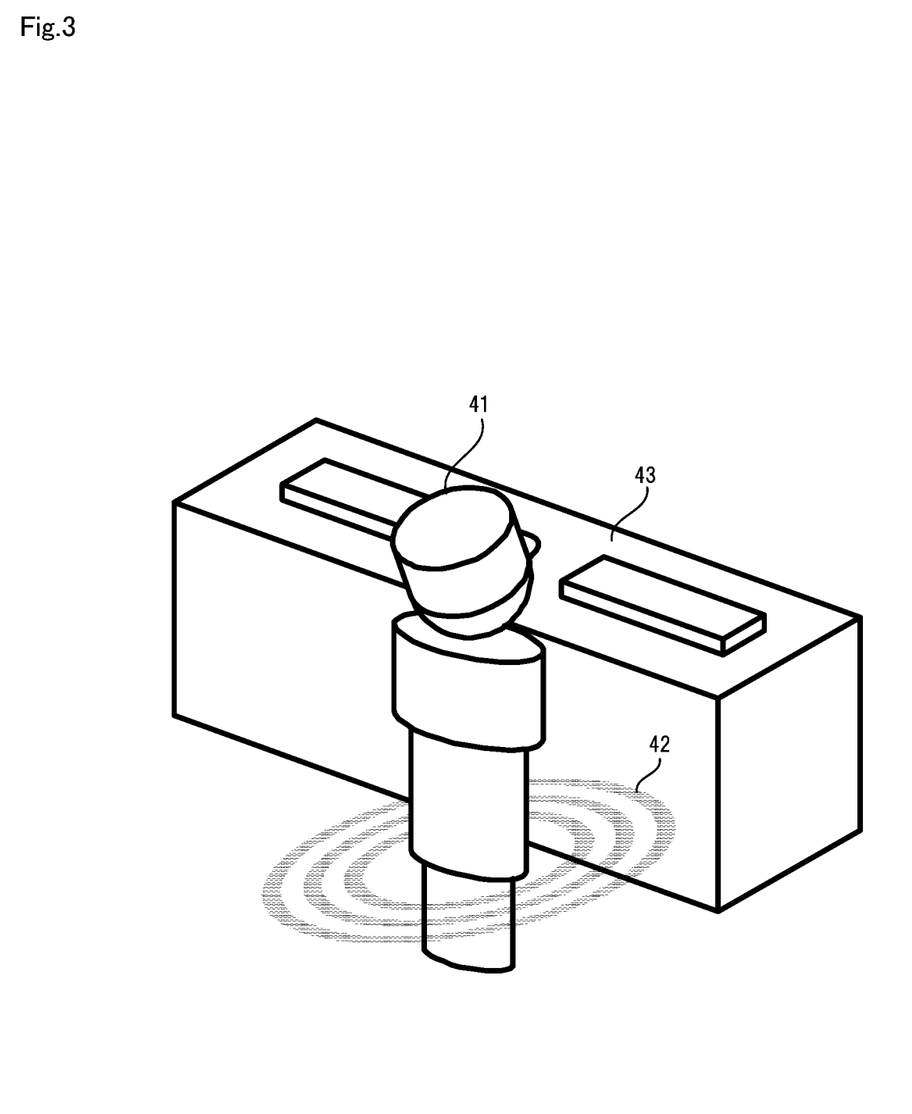
FIG. 3 is a diagram showing an example of a visual representation according to an embodiment of the present invention.

Here, the configuration of the action evaluation apparatus according to the present embodiment will be described in further detail with reference to FIGS. 2 and 3. FIG. 2 is a block diagram showing a specific configuration of the action evaluation apparatus according to the embodiment of the present invention. FIG. 3 is a diagram showing an example of a visual representation according to an embodiment of the present invention.

First, in the present embodiment, the action evaluation apparatus 10 is used to evaluate an action of a worker 40 on a production line of a factory constructed in a virtual space. VR (Virtual Reality) goggles 20 to be worn by the worker 40 and a manager 50 and a camera 30 for detecting the positions of the worker 40 and the manager 50 are connected to the action evaluation apparatus 10.

Also, the VR goggles 20 are equipped with motion sensors (not shown in FIG. 2) that detect movement of the VR goggles 20 and infrared sensors 21 that detect the positions and movements of the hands of the wearers. Among these, the motion sensors include acceleration sensors and angular velocity sensors and output signals that specify the movement of the VR goggles 20. The infrared sensors 21 include light sources that output infrared beams and image sensors that receive infrared beams reflected by the hands of the wearers, and the infrared sensors 21 output infrared images as signals. Note that there is no particular limitation on the VR goggles 20 and the sensors used therein. In the present embodiment, it is possible to use various VR goggles and sensors that will be developed in the future.

Also, as shown in FIG. 2, the action evaluation apparatus 10 according to the present embodiment includes the action detection unit 11, the action evaluation unit 12, and the visual representation addition unit 13, as well as a virtual space construction unit 14 that constructs a virtual space. The virtual space construction unit 14 creates an object representing a person in the virtual space and causes the object to act in accordance with the action detected by the action detection unit 11.

Specifically, as shown in FIG. 3, in the constructed virtual space, the virtual space construction unit 14 creates an object (hereinafter denoted as "worker object") 41 representing the worker 40 and an object (hereinafter denoted as "equipment object") 43 representing equipment of the production line. Also, in the virtual space, the virtual space construction unit 14 also creates an object (hereinafter denoted as "manager object") representing the manager 50 in the virtual space, although this is not shown in FIG. 3.

Also, in the present embodiment, the action detection unit 11 detects the actions of the worker 40 and the manager 50 based on signals from the motion sensors and signals from the infrared sensors 21 equipped in the VR goggles 20. Also, the action detection unit 11 detects the positions of the worker 40 and the manager 50 based on image data from the camera 30 for position detection.

Also, when the actions and positions are detected by the action detection unit 11, the virtual space construction unit 14 specifies the positions in the virtual space based on the positions of the worker 40 and the manager 50 detected by the action detection unit 11. Also, the virtual space construction unit 14 causes the worker object 41 and the manager object to act in accordance with the actions detected by the action detection unit 11 at the specified positions.

For this reason, by wearing the VR goggles, the worker 40 and the manager 50 can move around freely in the virtual space constructed by the action evaluation apparatus 10 and perform actions in the virtual space, and can feel as if they exist in the virtual space. Also, the manager 50 can observe how the worker object 41 handles the equipment object 43.

Also, in the present embodiment, as shown in FIG. 3, the visual representation addition unit 13 can add a dot cluster 42, for example, as a visual representation to the associated portion of the worker object 41. To the manager 50, the dot cluster 42 appears as a haze around the worker object 41 and is translucent, and therefore the manager 50 can check both the action and the problematic part of the worker 40 in one instance.

The dot cluster 42 is preferably colored with a color that stands out, such as red or blue. Also, the color of the dot cluster 42 may differ according to the portion of the worker object 41. Furthermore, in the example shown in FIG. 3, the shape of the dot cluster 42 is ring-shaped, but there is no limitation to this, and for example, the shape may be spherical.

Also, as stated above, the action evaluation unit 12 determines whether or not the action detected by the action detection unit 11 matches a specific action. Examples of specific actions include actions such as the worker 40 moving his or her head upward, downward, leftward, rightward, forward, or rearward while working. Specifically, it is a case in which the worker 40 does not know the next task and searches for the location to be worked on or looks around in order to search for a specific part. Due to the fact that the line of sight is normally focused on one specific point and the head is not often moved upward, downward, leftward, rightward, frontward, or rearward during a task, in the case where the worker 40 performs such an action, there is a possibility that the worker 40 is unsure and a problem has occurred. Also, the head is associated with this specific action as the part associated with the specific action.

Accordingly, when the worker 40 performs an action such as moving the head upward, downward, leftward, rightward, forward, or rearward while working, the action evaluation unit 12 determines that the action of the worker 40 matches the specific action. Accordingly, the visual representation addition unit 13 adds the dot cluster 42 as a visual representation to the periphery of the part corresponding to the head of the worker object 41.

Also, the visual representation addition unit 13 can change the shade of the color of the dot cluster 42 in accordance with the degree of the action of the worker 40 moving his or her head. In this case, based on the shade of the color, the manager 50 can determine how unsure the worker 40 is.

Furthermore, examples of the specific action also include an action of changing the posture while performing the same task. If the posture of the worker gradually changes while the worker is performing the same task, it is often the case that a burden has been placed on the lower back or the like of the worker and the body is tired, and therefore there is a possibility that a problem has occurred.

The lower back is associated with this specific action as the part associated with the specific action. Accordingly, if the action evaluation unit 12 determines that the action of the worker 40 matches the specific action, as shown in FIG. 3, the visual representation addition unit 13 adds the dot cluster 42 as a visual representation around the part corresponding to the lower back of the worker object 41.

Note that if the change in posture is caused by a habit of the worker 40, there is a possibility that his or her task efficiency will improve even if his or her posture changes. Accordingly, if the action of changing the posture while performing the same task is set as a specific action, it is preferable to define the direction of the action.

Other examples of specific actions include an action in which the distance between the position of the head and the position of a hand exceeds a set range. In this case, there is a possibility that the worker 40 is extending his or her back in an attempt to get an item at a hard-to-reach location, which is an environment in which it is difficult to perform a task. Therefore, there is a possibility that a problem has occurred. Note that the lower back is associated as an associated part for this specific action as well.

Operations of Apparatus

Figure 4:
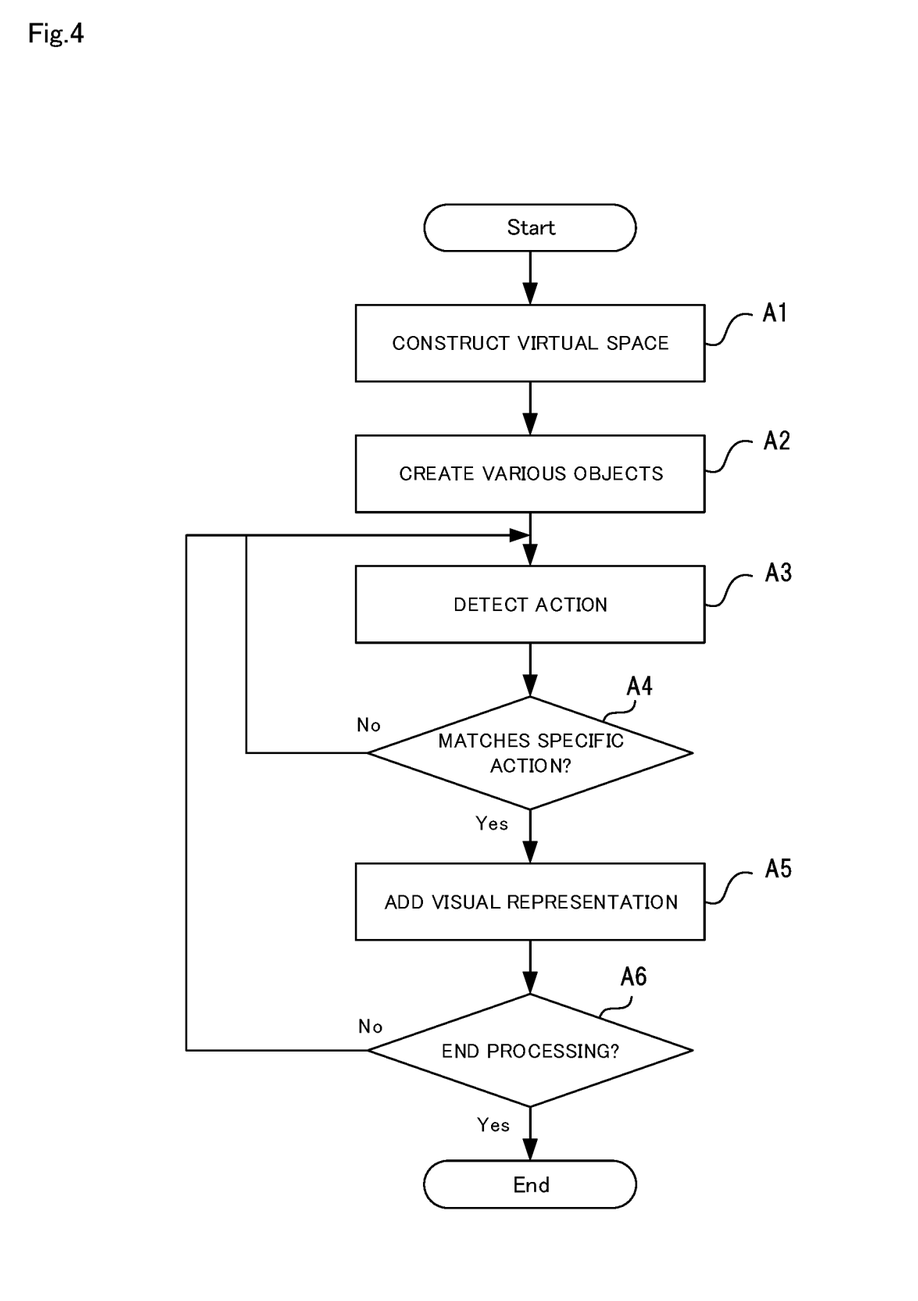
FIG. 4 is a flow diagram showing operations performed by an action evaluation apparatus according to an embodiment of the present invention.

Next, operations of the action evaluation apparatus according to the present embodiment will be described with reference to FIG. 4. FIG. 4 is a flow diagram showing operations of the action evaluation apparatus according to the embodiment of the present invention. In the following description, FIGS. 1 to 3 will be referenced as needed. Also, in the present embodiment, an action evaluation method is carried out by causing the action evaluation apparatus to operate. Accordingly, the description of the action evaluation method according to the present embodiment is substituted with the following description of the operations of the action evaluation apparatus 10.

As shown in FIG. 4, first, the virtual space construction unit 14 constructs a virtual space (step A1). Next, the virtual space construction unit 14 creates the worker object 41, the equipment object 43, and the manager object in the constructed virtual space (step A2).

Upon steps A1 and A2 being executed, the worker 40 wearing the VR goggles 20 can perform the task in the virtual space, and the manager 50 can check the actions of the worker 40. Also, the action detection unit 11 detects the actions of the worker 40 and the manager 50 based on the signals from the motion sensors and the signals from the infrared sensors 21 mounted in the VR goggles 20 (step A3).

Next, the action evaluation unit 12 determines whether or not the action detected in step A3 matches the specific action (step A4). If it is determined in step A4 that the action detected in step A3 does not match a specific action, step A3 is executed again. On the other hand, if it is determined in step A4 that the action detected in step A3 matches a specific action, step A5 is executed.

In step A5, the visual representation addition unit 13 adds a visual representation to the associated portion of the worker object 41 (step A6). For example, if the specific action is an action in which the distance between the position of the head and the position of a hand exceeds a set range, the visual representation addition unit 13 adds the dot cluster 42 to the portion corresponding to the lower back of the worker object 41 (see FIG. 3).

Thereafter, the action detection unit 11 determines whether or not the end of processing has been instructed (step A6). If it is determined in step A6 that the end of processing has not been instructed, the action detection unit 11 executes step A3 again. On the other hand, if it is determined in step A6 that the end of processing has been instructed, the processing performed by the action evaluation apparatus 10 ends.

Effects of Embodiment

As described above, in the present embodiment, the manager 50 can check the specific action of the worker 40 without failure, and therefore failure to identify all problems caused by the specific action is suppressed. In other words, in the present embodiment, even if the manager 40 is not an expert on production line design, he or she can notice problems similarly to an expert. According to the present embodiment, it is possible to construct a production line according to which the worker 40 can perform a task efficiently and physical burden on the worker can be reduced. As a result, it is possible to suppress the occurrence of faulty products.

Also, in the present embodiment, detection of the specific action of the worker 40 can be performed in a virtual space, and therefore it is not necessary to actually create a mock-up of the equipment of the production line. Thus, the cost of constructing a production line can be reduced. Furthermore, it is possible to flexibly handle modification and improvement of the production line.

Modified Example

In the example shown in FIG. 2, the manager 50 performs observation in the virtual space while wearing the VR goggles 20, similarly to the worker 40. However, the present embodiment is not limited to the example shown in FIG. 2. For example, if a common display apparatus is connected to the action evaluation apparatus 10, the manager 50 may perform observation in the virtual space via the screen of the display apparatus. With this mode as well, the manager 50 can check the visual representations added to the worker object 41.

Also, in the example shown in FIG. 3, the dot configuration 42 is illustrated as an example of a visual representation, but the visual representation is not particularly limited in the present embodiment. In the present embodiment, for example, it is possible to use a mode in which the color of the associated portion of the worker object 41 changes.

Furthermore, in the example shown in FIG. 2, detection of the action of the worker 40 is performed using the motion sensors mounted in the VR goggles 20, the infrared sensors 21 mounted therein, and the camera 30 for position detection. However, in the present embodiment, the method of detecting the action is not particularly limited. The detection of the action may be performed using a motion capture technique, for example.

Application Example

The present embodiment will describe an example in which the action evaluation apparatus 10 is used to evaluate an action of a worker 40 on a production line. However, the application of the action evaluation apparatus 10 is not limited thereto. For example, the action evaluation apparatus 10 can also be used to evaluate actions of doctors and nurses in an operating room. In such a case, it is possible to evaluate whether or not the nurse can easily pass the correct surgical tools to the doctor.

Furthermore, the action evaluation apparatus 10 can also be used to evaluate actions of a serviceman performing maintenance on various types of machines, such as automatic teller machines (ATM) for a bank, multifunction printers, and machine tools.

Program

It is sufficient that a program according to the embodiment of the present invention is a program for causing a computer to execute steps A1 to A6 shown in FIG. 4. By installing the program on a computer and executing it, it is possible to realize the action evaluation apparatus 10 and the action evaluation method according to the present embodiment. In such a case, the CPU (Central Processing Unit) of the computer functions as the action detection unit 11, the action evaluation unit 12, the visual representation addition unit 13, and the virtual space construction unit 14 and performs processing.

Figure 5:
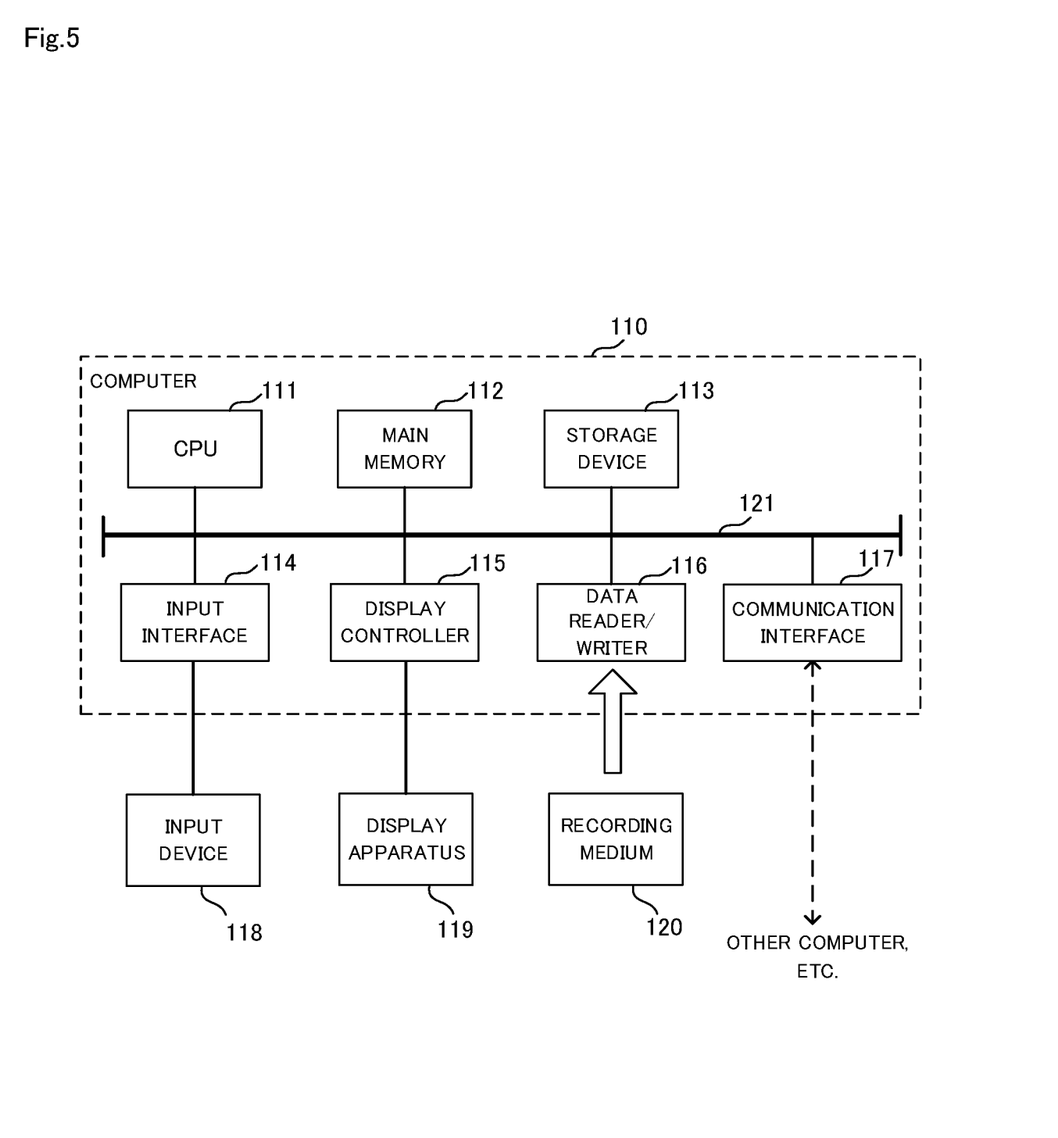
FIG. 5 is a block diagram showing an example of a computer that realizes an action evaluation apparatus according to an embodiment of the present invention.

Here, a computer that realizes the action evaluation apparatus 10 by executing the program according to the present embodiment will be described with reference to FIG. 5. FIG. 5 is a block diagram showing an example of a computer that realizes the action evaluation apparatus according to an embodiment of the present invention.

As shown in FIG. 5, a computer 110 includes a CPU 111, a main memory 112, a storage device 113, an input interface 114, a display controller 115, a data reader/writer 116, and a communication interface 117. These units are connected to each other via a bus 121 such that data communication is possible.

The CPU 111 carries out various calculations by expanding the programs (codes) according to the present embodiment, which are stored in the storage device 113, to the main memory 112 and executing them in a predetermined sequence. The main memory 112 is typically a volatile storage device such as a DRAM (Dynamic Random Access Memory). Also, the program according to the present embodiment is provided in a state of being stored in a computer-readable recording medium 120. Note that the program according to the present embodiment may be distributed through the Internet, which is connected to via the communication interface 117.

Also, specific examples of the storage device 113 include semiconductor storage devices such as flash memories, in addition to hard disk drives. The input interface 114 mediates data transfer between the CPU 111 and an input device 118, such as a keyboard and a mouse. The display controller 115 is connected to the display apparatus 119 and controls display on the display apparatus 119.

The data reader/writer 116 mediates data transfer between the CPU 111 and the recording medium 120, reads out programs from the recording medium 120, and writes the results of processing performed by the computer 110 in the recording medium 120. The communication interface 117 mediates data transfer between the CPU 111 and other computers.

Specific examples of the recording medium 120 include general-purpose semiconductor storage devices such as CF (Compact Flash (registered trademark)) and SD (Secure Digital), magnetic storage mediums such as flexible disks, and optical storage mediums such as CD-ROMs (Compact Disk Read Only Memory).

The above-described embodiment can be partially or entirely expressed by, but is not limited to, the following Supplementary Notes 1 to 9.

Supplementary Note 1

An action evaluation apparatus including:

an action detection unit configured to detect an action of a target person;

an action evaluation unit configured to determine whether or not the detected action matches a pre-set specific action; and a visual representation addition unit configured to, if it is determined by the action evaluation unit that the detected action matches the specific action, add a visual representation to a portion associated with the specific action in advance, on the person or an object representing the person displayed on a screen.

Supplementary Note 2

The action evaluation apparatus according to Supplementary Note 1, further including a virtual space construction unit configured to construct a virtual space, wherein the virtual space construction unit creates the object representing the person in the virtual space and causes the object to act in accordance with the action detected by the action detection unit, and the visual representation addition unit adds the visual representation to the portion associated with the specific action in advance, on the object representing the person displayed on a screen.

Supplementary Note 3

The action evaluation apparatus according to Supplementary Note 1, wherein the visual representation addition unit adds a dot cluster as the visual representation.

Supplementary Note 4

An action evaluation method, including:

(a) a step of detecting an action of a target person;

(b) a step of determining whether or not the action detected in the step (a) matches a pre-set specific action; and (c) a step of, if it is determined in the step (b) that the detected action matches the specific action, adding a visual representation to a portion associated with the specific action in advance, on the person or an object representing the person displayed on a screen.

Supplementary Note 5

The action evaluation method according to Supplementary Note 4, further including:

(d) a step of constructing a virtual space; and (e) a step of creating the object representing the person in the virtual space and causing the object to act in accordance with the action detected in the step (a), wherein in the step (c), the visual representation is added to the portion associated with the specific action in advance, on the object representing the person displayed on a screen.

Supplementary Note 6

The action evaluation method according to Supplementary Note 4, wherein in the step (c), a dot cluster is added as the visual representation.

Supplementary Note 7

A computer-readable storage medium storing a program including commands for causing a computer to execute:

(a) a step of detecting an action of a target person;

(b) a step of determining whether or not the action detected in the step (a) matches a pre-set specific action; and (c) a step of, if it is determined in the step (b) that the detected action matches the specific action, adding a visual representation to a portion associated with the specific action in advance, on the person or an object representing the person displayed on a screen.

Supplementary Note 8

The computer-readable storage medium according to Supplementary Note 7, wherein the program further includes commands for causing the computer to execute:

(d) a step of constructing a virtual space; and (e) a step of creating the object representing the person in the virtual space and causing the object to act in accordance with the action detected in the step (a), and in the step (c), the visual representation is added to the portion associated with the specific action in advance, on the object representing the person displayed on a screen.

Supplementary Note 9

The computer-readable storage medium according to Supplementary Note 7, wherein in the step (c), a dot cluster is added as the visual representation.

Although the present invention has been described with reference to an embodiment, the present invention is not limited to the above-described embodiment. Various modifications that a person skilled in the art can understand may be applied to the configuration and the details of the present invention within the scope of the present invention.

This application claims priority to Japanese Patent Application No. 2015-43583, filed on Mar. 5, 2015, the disclosure of which is incorporated in its entirety herein by reference.

INDUSTRIAL APPLICABILITY

As described above, according to the present invention, it is possible to perform evaluation of actions based on actual actions and suppress failure to identify problems caused by actions. The present invention is useful for action evaluation in a production line at a factory, action evaluation in maintenance of various types of machines, action evaluation in surgery, and the like.

DESCRIPTIONS OF REFERENCE NUMERALS

10 Action evaluation apparatus
11 Action detection unit
12 Action evaluation unit
13 Visual representation addition unit
14 Virtual space construction unit
20 VR goggles
21 Infrared sensor
30 Camera for position detection
40 Worker
41 Worker object
42 Dot cluster
43 Equipment object
50 Manager
110 Computer
111 CPU
112 Main memory
113 Storage device
114 Input interface
115 Display controller
116 Data reader/writer
117 Communication interface
118 Input device
119 Display apparatus
120 Recording medium
121 Bus

What is claimed is:

1. An action evaluation apparatus for a manager to evaluate an action of a worker in a virtual space, comprising:

a 1st virtual reality goggle for the worker that has a 1st motion sensor;

a 2nd virtual reality goggle for the manager that has a 2nd motion sensor;

a camera for detecting the positions of the worker and the manager;

an action detection unit configured to detect an action of the worker wearing the 1st virtual reality goggles based on a signal of the 1st motion sensor, and to detect the position of the worker based on the image data from the camera;

a virtual space construction unit configured to construct the virtual space, to create an object representing the worker in the detected position of the virtual space, and to cause the object to act in accordance with the action detected by the action detection unit;

an action evaluation unit configured to determine whether or not the detected action matches a pre-set specific action; and a visual representation addition unit configured to, if it is determined by the action evaluation unit that the detected action matches the specific action, add a visual representation to a portion associated with the specific action in advance, on the object representing the worker displayed on a screen of the 2nd virtual reality goggle of the manager, so as to surround the object representing the worker, wherein the action evaluation apparatus is realized by a computer, a processor of the computer functioning as the action detection unit, the virtual space construction, the action evaluation unit, and the visual addition unit.

2. The action evaluation apparatus according to claim 1, wherein the visual representation addition unit adds a dot cluster so as to surround the object representing the worker, as the visual representation.

3. An action evaluation method for a manager to evaluate an action of a worker in a virtual space, using

- a 1st virtual reality goggle for the worker that has a 1st motion sensor;
- a 2nd virtual reality goggle for the manager that has a 2nd motion sensor;
- a camera for detecting the positions of the worker and the manager;

and comprising:

- (a) a step, performed by a computer, of detecting an action of the worker wearing the 1st virtual reality goggles based on a signal of the 1st motion sensor, and of detecting the position of the worker based on the image data from a camera;
- (b) a step, performed by computer, of constructing the virtual space;
- (c) a step of creating an object representing the worker in the detected position of the virtual space, and of causing the object to act in accordance with the action detected by the step (a);
- (d) a step, performing by the computer, of determining whether or not the action detected in the step (a) matches a pre-set specific action; and
- (e) a step, performing by the computer, of, if it is determined in the step (b) that the detected action matches the specific action, adding a visual representation to a portion associated with the specific action in advance, on the person or an object representing the worker displayed on a screen of the 2nd virtual reality goggle of the manager, so as to surround the object representing the worker.

4. The action evaluation method according to claim 3, wherein in the step (c), a dot cluster is added so as to surround the object representing the worker, as the visual representation.

5. A non-transitory computer-readable storage medium storing a program for a manager to evaluate an action of a worker in a virtual space, including commands for causing a computer being connected to:

- a 1st virtual reality goggle for the worker that has a 1st motion sensor;
- a 2nd virtual reality goggle for the manager that has a 2nd motion sensor;
- a camera for detecting the positions of the worker and the manager;

and including a processor to execute:

- (a) a step, performed by the processor, of detecting an action of a target person wearing the 1st virtual reality goggles based on a signal of the 1st motion sensor, and of detecting the position of the worker based on the image data from a camera;
- (b) a step, performed by computer, of constructing the virtual space;
- (c) a step of creating an object representing the worker in the detected position of the virtual space, and of causing the object to act in accordance with the action detected by the step (a);
- (d) a step, performed by the processor, of determining whether or not the action detected in the step (a) matches a pre-set specific action; and
- (e) a step, performed by the processor, of, if it is determined in the step (b) that the detected action matches the specific action, adding a visual representation to a portion associated with the specific action in advance, on the person or an object representing the worker displayed on a screen of the 2nd virtual reality goggles of the manager, so as to surround the object representing the worker.

6. The non-transitory computer-readable storage medium according to claim 5, wherein in the step (c), a dot cluster is added so as to surround the object representing the worker, as the visual representation.

* * * * *